Dec. 26, 1967   J. C. TROTTER   3,360,217
DUCT ROTATION SYSTEM FOR VTOL AIRCRAFT
Filed May 26, 1965   3 Sheets-Sheet 1

INVENTOR
JOHN C. TROTTER

BY Claude Funkhouser
ATTORNEY

United States Patent Office 3,360,217
Patented Dec. 26, 1967

3,360,217
DUCT ROTATION SYSTEM FOR
VTOL AIRCRAFT
John C. Trotter, Williamsville, N.Y., assignor, by mesne assignments, to the United States of America as represented by the Secretary of the Navy
Filed May 26, 1965, Ser. No. 459,128
4 Claims. (Cl. 244—12)

ABSTRACT OF THE DISCLOSURE

The invention is directed to the mechanism for controlling the angular displacement of the ducts housing the motors and propellers, either simultaneously or singly.

---

This invention relates to a control for the angular displacement of ducts for vertical take-off and land airplanes and to the provision of means for synchronizing the angular movement of the individual ducts with each other and to provide means for stopping and holding the ducts at any one particular angular position.

In the past it has been recognized that the individual ducts making up the housing for the propellers of a vertical take-off and land airplane provide for the stabilization of the plane. Structure for accomplishing this has been used, but the necessary torque required the use of heavy motors. In the event of failure of any one of the motors, the entire system was rendered useless. With the invention of strain wave gearing it was possible to produce a high torque from a relatively small motor. By making use of this type of gearing the problem of synchronously turning the ducts through some predetermined angular displacement, even through one or more of the motors should fail, was overcome.

The object of the present invention is to provide means for rotating the ducts, of a vertical take-off and land airplane, through an angular displacement, selectively or in unison, so that the angular movement of one of the ducts is duplicated by each of the other ducts.

Another object of the present invention is to provide means, connecting the driving means for the ducts, which will insure synchronously rotated ducts, and which will operate to rotate all of the ducts through the use of one or more of the driving units.

Still another object of the present invention is to provide some means attached to the driving means for the rotation of the ducts which will enable the operator to stop the rotation with the ducts at approximately the same angle to the vertical so that the drive imparted to the airplane will be uniformly in one direction.

Still another object of the present invention is to provide a motion transmitting mechanism of the strain wave gearing type which will produce large torque which relatively small motors and, which through the system used to control the operation of the ducts, will enable the ducts to be operated even though all of the motors do not function.

Other objects, advantages and novel features of the present invention will become apparent from the following detailed description of the invention when considered in conjunction with the accompanying drawings wherein.

Figure 1:
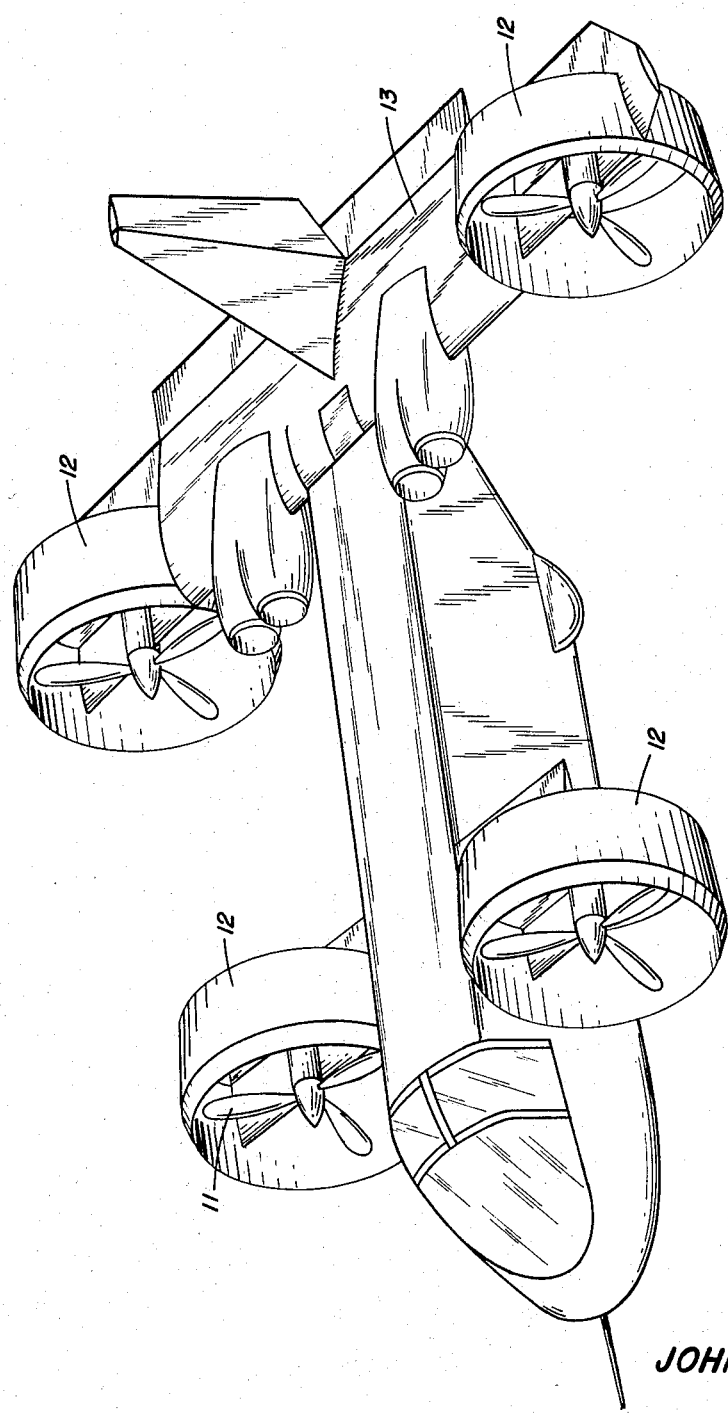
FIG. 1 is a perspective view of the type of airplane on which the invention is used.

Referring particularly to the drawings wherein like parts are designated by like numerals, the plane (FIG. 1) is of the vertical take-off and land type and has four duct housed propellers 11. The ducts 12 housing the propellers are mounted on tubes 10 and are capable of rotation through an angle of at least 91° to move them from a vertical to a horizontal position. A stop 9 positioned in the path of movement of the tube 10 limits the angular displacement of the ducts. With the ducts in a vertical position the plane may make a vertical take-off and when airborne the ducts may be moved through some angle to provide forward motion. The necessary angle may vary with the desired speed of the plane and the size of the sustaining wings 13. The surfaces of the ducts also serve as sustaining areas.

Figure 2:
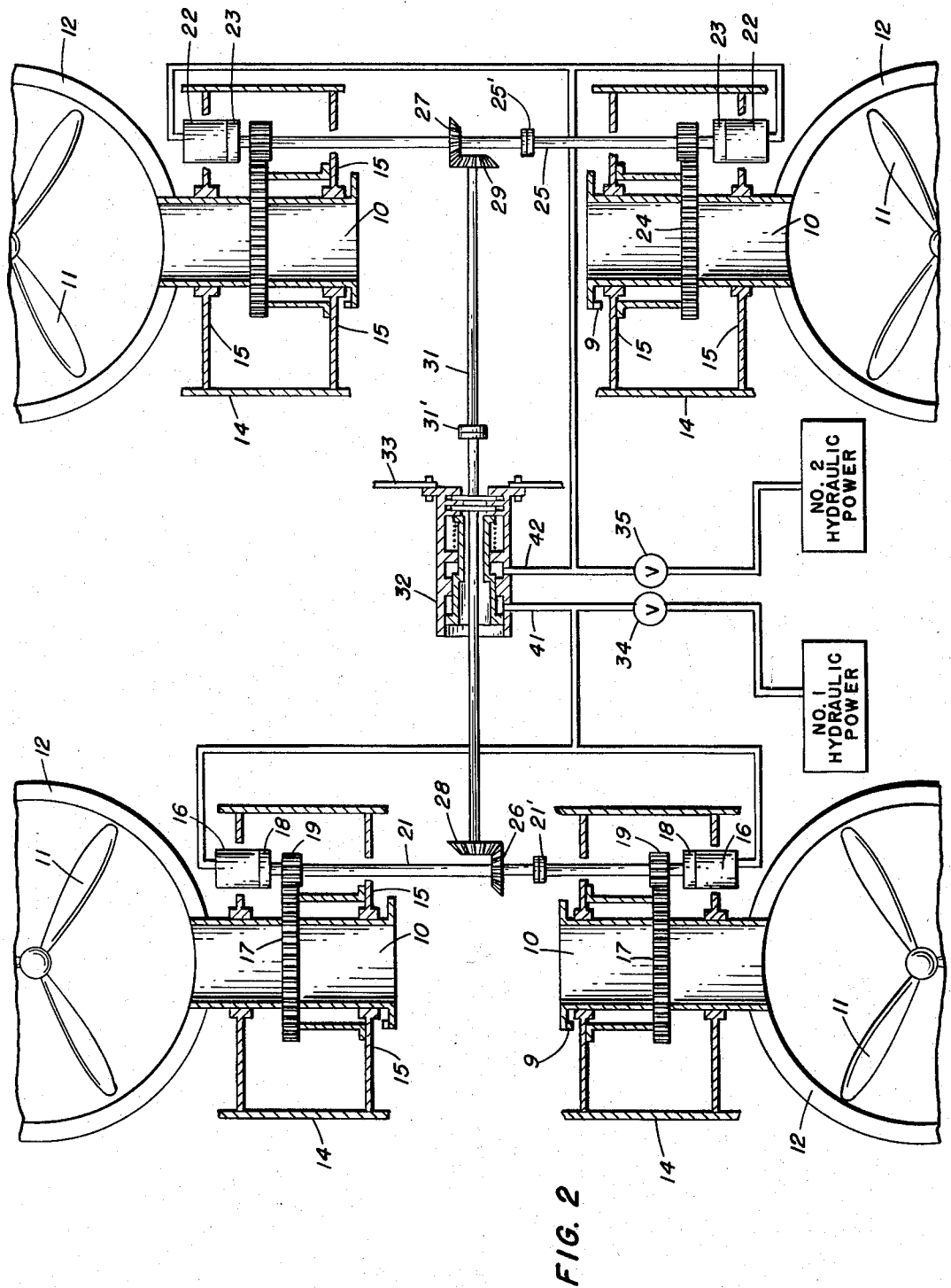
FIG. 2 is a diagrammatic view of the control system.

FIG. 2 which is a diagrammatic showing of the control system omits any showing of the structure of the plane other than a partial outline of the ducts. Each of the ducts 12 is carried by support structure 14 which includes bearings 15 in which the ducts are mounted for partial rotation. The forward support structure 14 also carries a hydraulic motor 16 for each of the ducts. This motor is designed to be as light as possible and still provide the necessary power to operate all of the ducts in the event of failure of any or all of the other motors.

Coupled to each of the hydraulic motors 16 is a strain wave gearing transmission 17. This particular gearing connects the motor 16 with the duct and by reason of its structure permits the use of the light motor while providing the necessary torque to operate the entire system. The motor running at a comparatively high rate of speed produces sufficient torque at a retarded rotation to operate the system. The system is not designed to operae on a single motor as each duct has its own motor and gearing transmission. However, the system must operate, even though there is motor failure, and while it is unlikely that more than one motor will fail, the system will still operate should more than one motor fail. The strain wave gear transmission is the subject of Patent No. 2,906,143 and its use, in combination with the light hydraulic motors is partly responsible for the success of the system. The hydraulic motors are directly connected to a gear box 18 which drives a pinion 19 which in turn drives the strain wave gear transmission.

The forward ducts are arranged in a straight line and the hydaulic motors 16 likewise arranged so that a common drive shaft 21 connects the two forward motors. A coupling 21' permits angular adjustment of the shafts to synchronize the angular position of the forward ducts.

The rear ducts are driven similarly to the forward ducts by hydaulic motors 22 connected to a gear box 23 which in turn drives the strain wave gearing transmission 24. These ducts are also arranged in line so that the motors 22 are in line and a common shaft 25 connects them. A coupling 25' similar to coupling 21' permits angular adjustments to synchronize the movement of the aft ducts.

Each of the shafts 21 and 25 are substantially at right angles to the longitudinal axis of the airplane and have at approximately their center position a bevel gear 26 and 27, respectively, which turn with the shafts. In mesh with these bevel gears 26 and 27 are other bevel gears 28 and 29, respectively. The gears 28 and 29 are mounted on opposite ends of a hollow drive shaft 31 which extends along the longitudinal axis of the plane and operatively connects the forward drive shaft 21 with the rearward drive shaft 25. Carried by this shaft 31 is a duct locking clutch or brake 32 which is attached and supported by the framework 33 of the plane. A coupling 31' permits relative rotation of the two parts of shaft 31 to allow the forward shaft 21 to be synchronized with aft shaft 25.

Control valves 34 and 35 admit hydraulic fluid from pumps (not shown) driven by the turbine gas engines, to operate the motors 16 and 22 and control the brake 32. Energization of the motors simultaneously release the brake.

Figure 3:
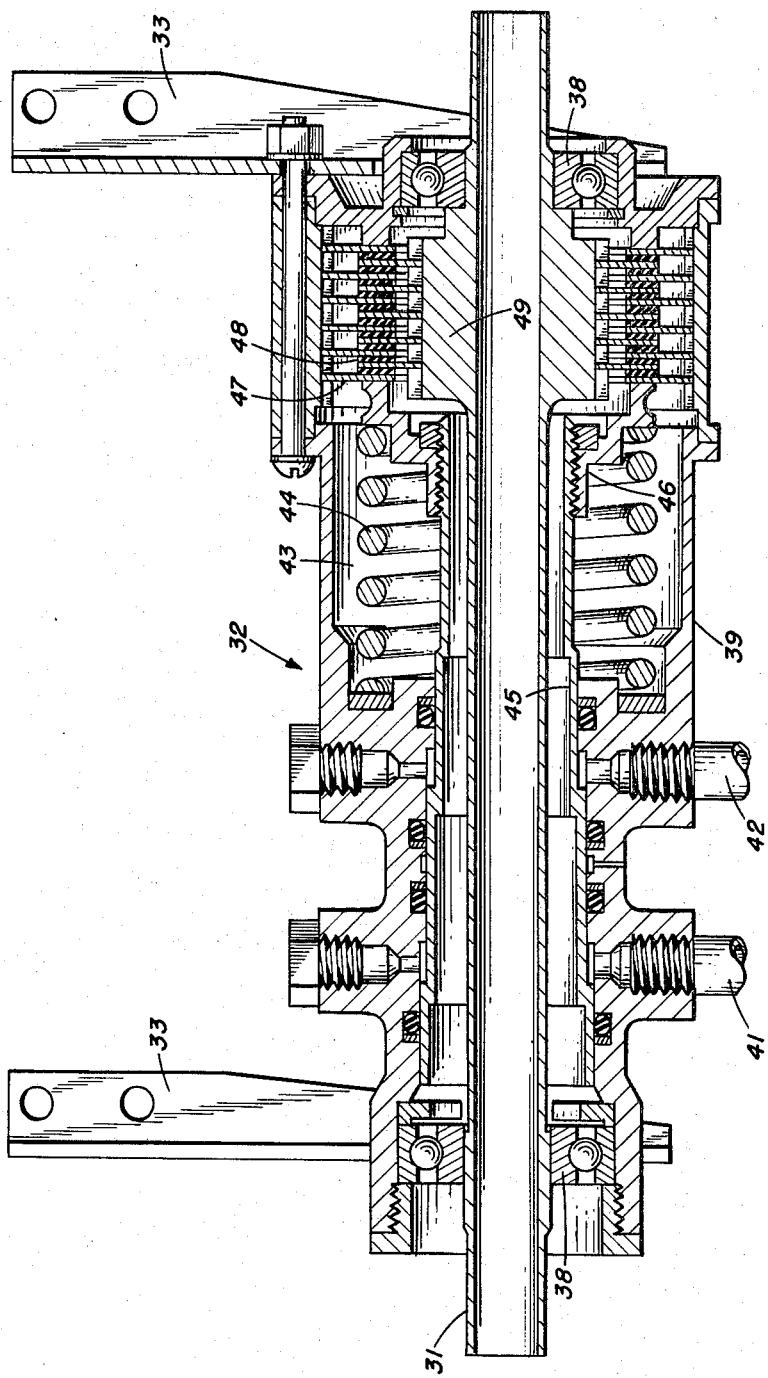
FIG. 3 is a cross-sectional view of the brake which is applied to the shaft to prevent movement of the ducts.

FIG. 3 of the drawings illustrates the brake or duct locking clutch and shows the connecting shaft 31 mounted for rotation in bearings 38 which in turn are supported by a cylindrical housing 39 The substantially cylindrical housing 39 is supported on the framework 33 and is provided with inlets 41 and 42 connected to the brake control valves 34 and 35. The housing is further fromed with a recessed portion 43, housing a coil spring 44. Carried by the cylindrical housing and movable therein a stepped piston 45 is actuated through the hydraulic pressure to compress the spring and hold the brake in released position. A collar 46 threaded onto one end of the piston engages the coil spring and upon movement of the piston compresses the spring. Release of the hydraulic pressure permits movement of the piston under the influence of the spring and causes the outer end of the collar to engage circular plate 47. The plate 47 contacts the discs 48 which are carried by an integral part 49 of the shaft 31, preventing rotation of the shaft. As the shaft 31 is interconnected through the shafts 21 and 25 with the motors 16 and 22 the rotation of all of the ducts is stopped at approximately the same position with relation to a vertical.

This control system permits synchronization of all of the ducts and provides means which will operate all of the ducts even in the event of the failure of one or more of the driving units. The use of the strain wave gearing gives a slow rotational drive with a large torque through the use of small high rotational speed motors. The synchronization of all of the ducts and the control through a single brake so that the thrust given to the airplane is in approximately the same plane makes the take-off and land plane feasible.

Obviously many modifications and variations of the present invention are possible in the light of the above teachings. It is therefore to be understood that within the scope of the appended claims the invention may be practiced otherwise than as specifically described.

What is claimed is:

1. In a vertical take-off and land airplane, having turbine gas engines and propellers housed in two forward and two aft ducts, a system of controlling the rotation of the propeller housing ducts comprising:

a plurality of hydraulic pumps operated by the turbine gas engines;

a plurality of hydraulic motors operated by the pressure of the hydraulic fluid generated by said pumps;

a motion transmitting mechanism connected to each of the hydraulic motors and to each of the ducts to transmit the rotation of the motors to a partial rotation of the ducts, said rotation of said ducts being limited to 91° of arc;

means connecting all of the ducts to synchronize the rotation thereof;

means associated with said connecting means to prevent rotation of the connecting means and consequently rotation of the ducts;

means connecting the forward ducts to operate in synchronism;

means connecting the aft ducts to rotate in synchronism;

means for adjusting the relative rotation of each of the forward ducts to each other to originally synchronize the rotational movement of the forward ducts.

2. A controlling system according to claim 1 and including means for adjusting the relative rotation of each of the aft ducts to each other to originally synchronize the rotational movement of the aft ducts.

3. A controlling system according to claim 1 and including connecting means between the forward connecting means and the aft connecting means to insure synchronizing rotational movement between the pair of forward ducts and the pair of aft ducts.

4. A controlling system according to claim 3 including means associated with the connecting means between the forward connecting means and the aft connecting means to adjust the angular position of the forward connecting means with the angular position of the aft connecting means to synchronize the angular displacement of the pair of forward ducts with the pair of aft ducts.

References Cited

UNITED STATES PATENTS

| 2,906,143 | 9/1959 | Musser | 74—640 |
| 2,961,189 | 11/1960 | Doak | 244—56 X |
| 2,969,935 | 1/1961 | Price | 244—7 |

FOREIGN PATENTS

| 534,864 | 3/1941 | Great Britain. |

MILTON BUCHLER, *Primary Examiner.*

ALFRED E. CORRIGAN, *Examiner.*

B. BELKIN, *Assistant Examiner.*